(12) United States Patent
Murata

(10) Patent No.: US 11,531,296 B2
(45) Date of Patent: Dec. 20, 2022

(54) ELECTRONIC APPARATUS, IMAGE FORMING APPARATUS, AND METHOD FOR PRODUCING ELECTRONIC APPARATUS

(71) Applicant: CANON KABUSHIKI KAISHA, Tokyo (JP)

(72) Inventor: Wataru Murata, Nagareyama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 156 days.

(21) Appl. No.: 16/868,817

(22) Filed: May 7, 2020

(65) Prior Publication Data

US 2020/0363765 A1 Nov. 19, 2020

(30) Foreign Application Priority Data

May 15, 2019 (JP) .............................. JP2019-092454

(51) Int. Cl.
*G03G 15/00* (2006.01)
*G03G 21/16* (2006.01)
*B65H 29/00* (2006.01)
*F16L 3/08* (2006.01)

(52) U.S. Cl.
CPC ............ *G03G 15/80* (2013.01); *B65H 29/00* (2013.01); *F16L 3/08* (2013.01); *G03G 21/1619* (2013.01); *G03G 21/1652* (2013.01); *B65H 2402/44* (2013.01); *B65H 2402/80* (2013.01); *B65H 2555/40* (2013.01); *G03G 2221/166* (2013.01); *G03G 2221/1678* (2013.01)

(58) Field of Classification Search
CPC ............... G03G 15/80; G03G 21/1619; G03G 21/1652; G03G 2221/166; G03G 2221/1678; F16L 3/08; F16L 3/12; B65H 29/00; B65H 2402/44; B65H 2402/80; B65H 2555/40
See application file for complete search history.

(56) References Cited

U.S. PATENT DOCUMENTS

| | | | | |
|---|---|---|---|---|
| 2013/0122741 | A1* | 5/2013 | Imoto | G03G 15/80 |
| | | | | 439/535 |
| 2017/0115621 | A1* | 4/2017 | Fujita | G03G 15/80 |
| 2017/0343952 | A1* | 11/2017 | Tokumoto | G03G 21/1652 |
| 2018/0077307 | A1* | 3/2018 | Sawada | G03G 21/1652 |
| 2018/0268957 | A1* | 9/2018 | Fukusaka | G03G 15/80 |

FOREIGN PATENT DOCUMENTS

| | | |
|---|---|---|
| JP | 2001-336509 | 12/2001 |
| JP | 2009-69641 | 4/2009 |

* cited by examiner

*Primary Examiner* — Sophia S Chen
(74) *Attorney, Agent, or Firm* — Venable LLP

(57) ABSTRACT

An electronic apparatus includes a first electronic device, a second electronic device, a bundled wire configured to supply at least one of an electric signal and electric power between the first and the second electronic devices, a frame member, a bundled wire guide, and a plurality of holding portions disposed at different positions on the wiring path. Each of the plurality of the holding portions includes a hinge portion connected to an upper portion of one of the pair of the side wall portions, a cover portion connected to the storage portion via the hinge portion, and an engagement portion to secure the cover portion in a closed position. The frame member includes a groove portion to which the bundled wire guide is fitted, and the bundled wire guide with the bundled wire stored is fitted into the groove portion.

11 Claims, 14 Drawing Sheets

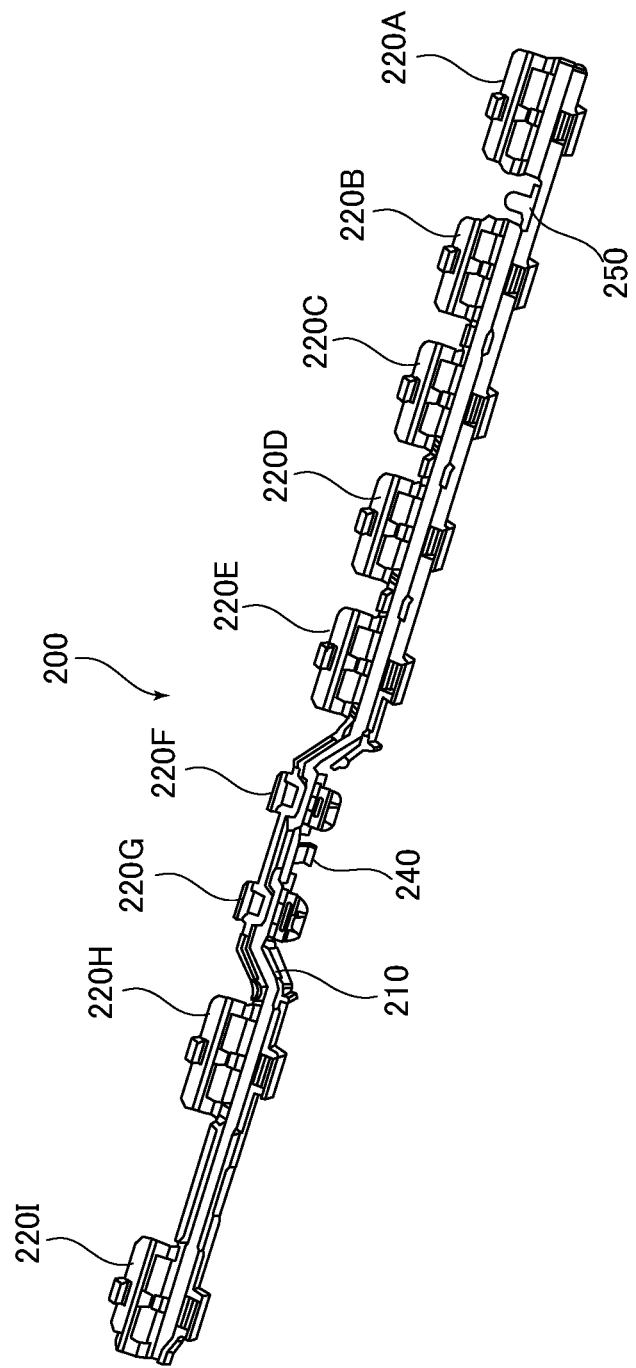

ELECTRONIC APPARATUS, IMAGE FORMING APPARATUS, AND METHOD FOR PRODUCING ELECTRONIC APPARATUS

BACKGROUND OF THE INVENTION

Field of the Invention

The present invention relates to an electronic apparatus furnished with an electronic device, an image forming apparatus and a method for producing the electronic apparatus.

Description of the Related Art

Generally, in an apparatus furnished with an electronic device, it is practiced to hold cables for an electronic signal transmission and an electric power supply with a clamp and wire the cables in a specified path. It is hitherto suggested as such a clamp that includes a holding portion to hold the cables and a fixing portion disposed below the holding member and fixed to the electronic device by inserted into a through hole provided, for example, on a panel of the electronic device (Japanese Laid-Open No. 2001-336509).

In a case where the cables are held with the clamp as suggested in Japanese Laid-Open No. 2001-336509 described above, it is possible to wire the cables in a desired shape of a path, but the clamp holds the cables only within a narrow width of the holding portion. Therefore, there are possibilities that the cables get stuck with other members and are inserted in between other members on a wiring path.

Also, when prevention of the cables from loosening by use of the clamp described above is tried, it will be necessary to arrange a large number of clamps on the wiring path of the cables, and will increase an assembly man-hour. Furthermore, since arrangements of the clamp in a place with an inadequate space are not easy, there are possibilities that a degree of freedom for design is decreased and also an increase in a size of an apparatus is derived.

SUMMARY OF THE INVENTION

According to a first aspect of the present invention, an electronic apparatus includes a first electronic device, a second electronic device, a bundled wire including one end coupled to the first electronic device, and another end coupled to the second electronic device, the bundled wire being configured to supply at least one of an electric signal and electric power between the first and the second electronic devices, a frame member to which the first electronic device is mounted, and a bundled wire guide configured to store the bundled wire, the bundled wire guide including a storage portion including a bottom portion extending in a direction along a wiring path of the bundled wire, and a pair of side wall portions standing on both edges, in a width direction orthogonal to the direction along the wiring path of the bundled wire, of the bottom portion and facing each other. The bottom portion and the pair of the side wall portions forms space to store the bundled wire is formed with, and a plurality of holding portions disposed at different positions on the wiring path. Each of the plurality of the holding portions includes a hinge portion connected to an upper portion of one of the pair of the side wall portions, a cover portion connected to the storage portion via the hinge portion in an openable and closable manner, and an engagement portion to secure the cover portion in a closed position, and each of the plurality of the holding portions is configured to hold the bundled wire in the storage portion with the cover portion secured in the closed position by the engagement portion. The frame member includes a groove portion to which the bundled wire guide is fitted, and the bundled wire guide with the bundled wire stored is fitted into the groove portion.

According to a second aspect of the present invention, a method for producing an electronic apparatus, wherein the electronic apparatus includes a first electronic device, a second electronic device, and a bundled wire with one end coupled to the first electronic device and another end coupled to the second electronic device, the bundled wire being configured to supply at least one of an electric signal and an electric power between the first and the second electronic device, the method includes preparing a bundled wire guide in accordance with a shape of a wiring path of the bundled wire, the bundled wire guide including a storage portion including a bottom portion extending in a direction along the wiring path of the bundled wire, and a pair of side wall portions standing on both edges, in a width direction orthogonal to the direction along the wiring path of the bundled wire, of the bottom portion and facing each other, wherein the bottom portion and the pair of the side wall portions forms space to store the bundled wire, and a plurality of holding portions disposed at different positions on the wiring path, each of the plurality of the holding portions including a hinge portion connected to an upper portion of one of the pair of the side wall portions, a cover portion connected to the storage portion via the hinge portion in an openable and closable manner, and an engagement portion to secure the cover portion in a closed position, storing the bundled wire to the bundled wire guide; and fitting the bundled wire guide, with the bundled wire stored, into a groove portion disposed in a frame member of the electronic apparatus.

Further features of the present invention will become apparent from the following description of exemplary embodiments with reference to the attached drawings.

BRIEF DESCRIPTION OF THE DRAWINGS

FIG. 9 is a perspective view of the wiring guide in an open state.

DESCRIPTION OF THE EMBODIMENTS

An image forming apparatus according to an embodiment of the present invention will be described below. However, it should be noted that sizes, materials, shapes, relative arrangements, and the like of components set forth in the embodiment below are to be appropriately changed depending on configurations and various conditions of an apparatus to which the present invention is applied, and do not limit the scope of the present invention.

General Configuration of Image Forming Apparatus

Figure 1:
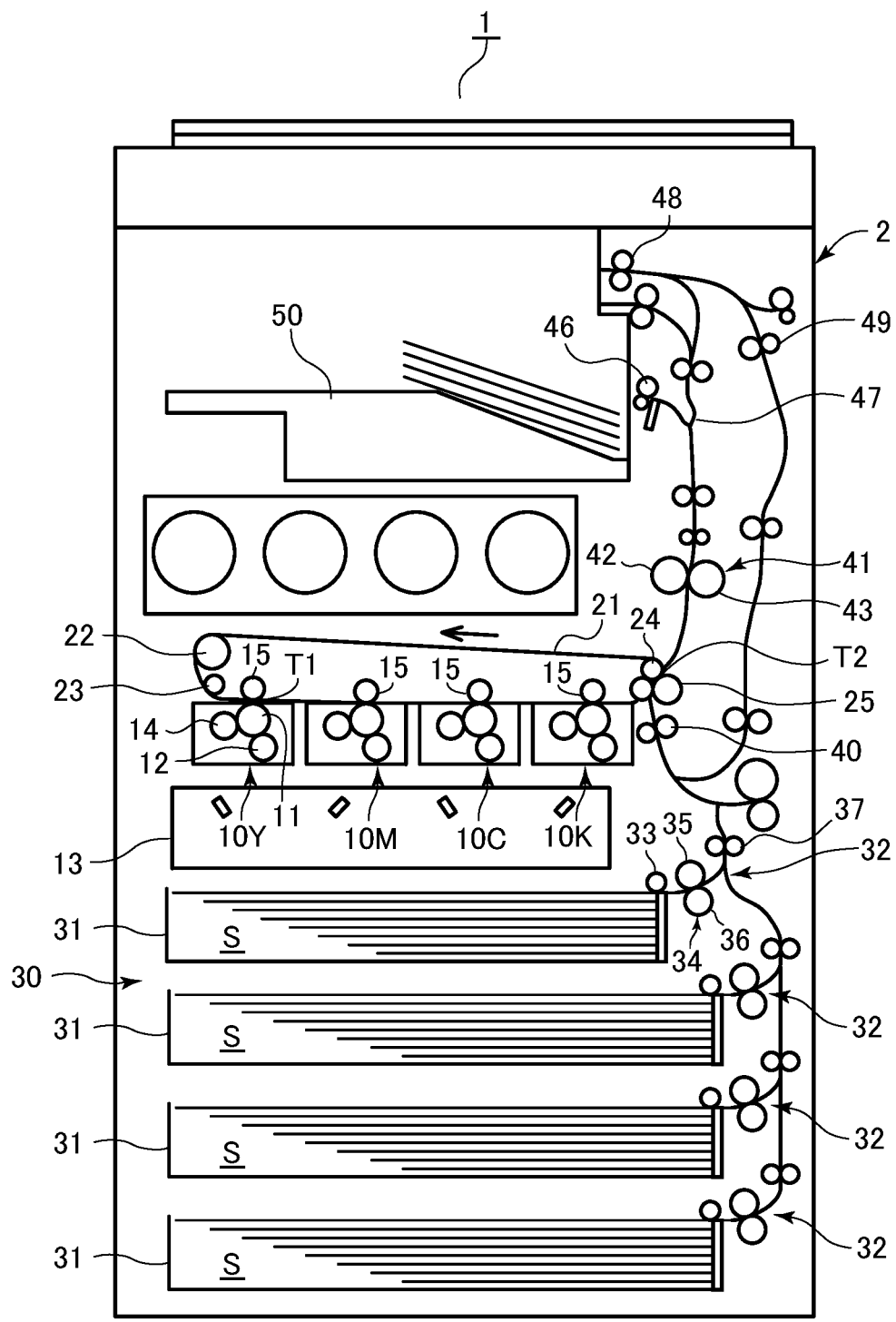
FIG. 1 is a diagram showing an image forming apparatus according to an embodiment of the present invention.

A printer 1 according to an embodiment of the present invention is, as shown in FIG. 1, an image forming apparatus including a so-called intermediate transfer tandem type image forming unit 10 including 4 process cartridges 10Y, 10M, 10C, and 10K inside an apparatus body 2. The printer 1 forms and outputs an image on a sheet S based on an image information read from a document and input from an external apparatus. To be noted, the sheet S is a recording medium which includes, other than a standard paper, a special paper such as a coated paper, a recording material of a special shape such as an envelope and an index sheet, a plastic film used for an overhead projector, a cloth, and the like. In addition, the document is an example of the sheet S, and may be a blank sheet of paper, or with single-sided or double-sided image formation.

The process cartridges 10Y, 10M, 10C, and 10K are the image forming units to form toner images of yellow (Y), magenta (M), cyan (C), and black (K), respectively. As structures of the process cartridges are basically same except for colors of stored toners, the structure of the process cartridge 10Y of yellow is described below as a representative.

The process cartridge 10Y includes a photosensitive drum 11, a charge unit 12, a development unit 14, and a cleaning unit. Also, an exposing unit 13 capable of scanning the photosensitive drum 11 based on the image information is arranged inside the apparatus body 2. When an image forming process is started, the photosensitive drum 11 is drivingly rotated, and a surface of the photosensitive drum 11 is uniformly charged by the charge unit 12. Thereafter, an electrostatic latent image is formed on the photosensitive drum 11 by the exposing unit 13. The electrostatic latent image formed on the photosensitive drum 11 is visualized (developed) to the toner image by a toner supplied from the development unit 14.

In the image forming unit 10, an intermediate transfer belt 21, which is an intermediate transfer body, is arranged, and is wound around a driving roller 22, a tension roller 23, and a secondary transfer inner roller 24. The intermediate transfer belt 21 is, with being moderately stretched by the tension roller 23, drivingly rotated by the driving roller 22 in a direction following rotation of the photosensitive drum 11.

On an inner circumference of the intermediate transfer belt 21, a primary transfer roller 15 is arranged facing each of the photosensitive drums 11 of the process cartridges 10Y, 10M, 10C, and 10K across the intermediate transfer belt 21. The toner image formed on each of the photosensitive drums 11 is primarily transferred to the intermediate transfer belt 21 at a primary transfer portion T1 formed between the primary transfer roller 15 and the photosensitive drum 11 in a manner of superimposing each other.

On a circumference of the intermediate transfer belt 21, a secondary transfer roller 25 is arranged facing the secondary transfer inner roller 24 across the intermediate transfer belt 21. The toner image born and carried on the intermediate transfer belt 21 is collectively transferred to the sheet S at a secondary transfer portion T2 formed between the secondary transfer roller 25 and the secondary transfer inner roller 24, and the toner image is formed on the sheet S.

In parallel with the image forming process as described above, a sheet feeding unit 30 provided in the apparatus body 2 performs a feeding process to feed the sheet S to the image forming unit 10. The sheet feeding unit 30, as a sheet feeding apparatus, includes an at least one feed cassette 31, and a feeding unit 32 provided for each feed cassette 31.

The feed cassette 31, as a sheet supporting means, includes a sheet supporting portion which is capable of ascending and descending, and the sheet supporting portion maintains an uppermost sheet at an appropriate height by ascending and descending. Also, the feed cassette 31 includes side regulation members 311a and 311b, which regulate positions of a sheet in a width direction, and a tailing edge regulation member 312, which regulates a position of a tailing edge of the sheet (refer to FIG. 4). The side regulation members 311a and 311b are a pair of regulation members which interconnectedly move symmetrically with respect to a conveyance center of the sheet (conveyance center line) Rc, and the conveyance center line Rc in this embodiment is a center line of a sheet conveyance path area in the width direction Rmax.

The sheet S fed by the sheet feeding unit 30 is delivered to a pair of registration rollers 40 arranged immediately in front of the secondary transfer portion T2. The pair of the registration rollers 40 correct a sheet skew, and also convey the sheet S to the secondary transfer portion T2 in synchronizing with progress of the image forming process at the image forming unit 10.

The sheet S with an unfixed toner image transferred at the secondary transfer portion T2 is delivered to a fixing unit 41. The fixing unit 41 includes a heating roller 42 heated by a heat source such as a halogen heater and a counter roller 43 being in a pressure contact with the heating roller 42. And, by conveying the sheet S in a sandwiched manner between the heating roller 42 and the counter roller 43 and by providing with a heat and a pressure, the toner is fusion-bonded, and the image is fixed on the sheet S.

When the sheet S with the toner image fixed at the fixing unit 41 is delivered to a pair of sheet discharge rollers 46, the sheet S is discharged to a discharge tray 50. Also, in a case of double-sided printing, at a branch conveyance portion 47 arranged between the fixing unit 41 and the pair of the sheet discharge rollers 46, the sheet S is guided toward a reverse conveyance unit 48, and is delivered to a duplex conveyance unit 49 with a first surface (front surface) and a second surface (back surface) reversed at the reverse conveyance unit 48. Then, the sheets S conveyed to the pair of the registration rollers 40 by the duplex conveyance unit 49 is transferred with the toner image again at the secondary transfer portion T2. Thereafter, the toner image is fixed by the fixing unit 41, and the sheet S is discharged to the discharge tray 50.

Feeding Unit

Figure 2:
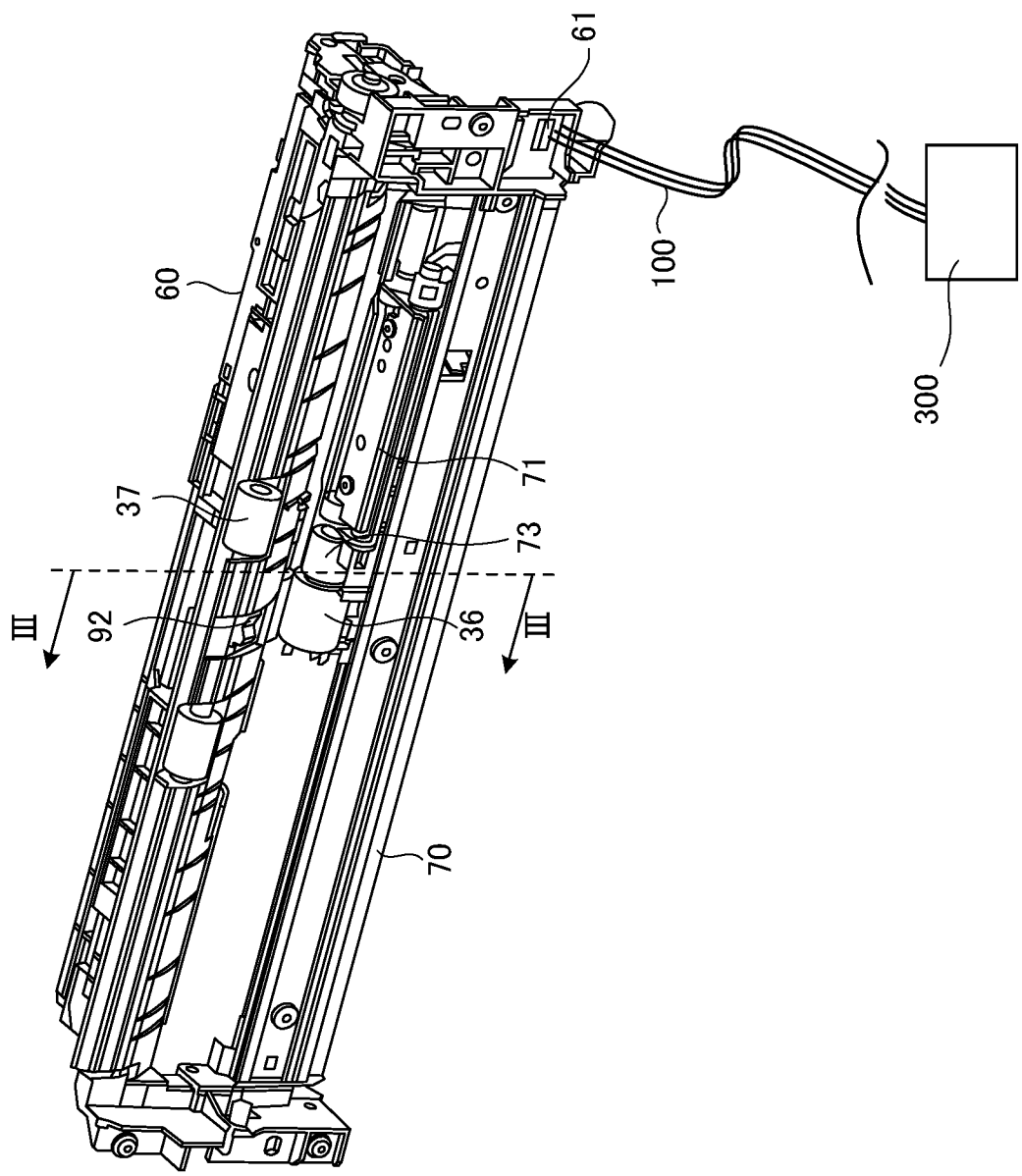
FIG. 2 is a perspective view of a feeding unit.
Figure 3:
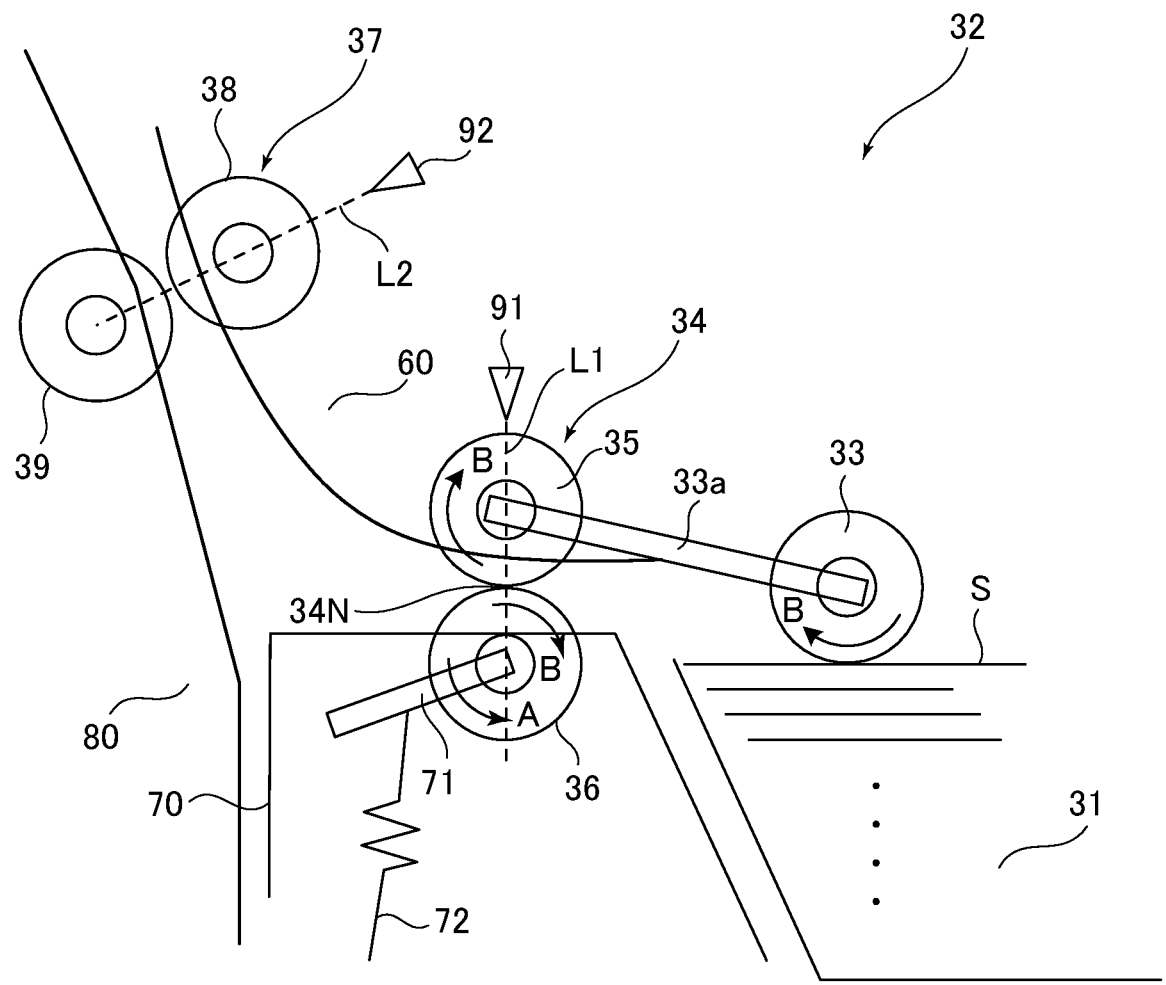
FIG. 3 is a schematic diagram showing a structure of the feeding unit.

Next, a configuration of the feeding unit 32 described above will be described in detail. As shown in FIGS. 2 and 3, the feeding unit 32 includes a pickup roller 33, a pair of separation rollers 34, and a pair of drawing rollers 37. The pickup roller 33 is supported by a pickup arm 33a in a manner of being capable of swinging freely, and sends out the sheet in abutting on the uppermost sheet of the sheet S supported by the feed cassette 31. Also, the pair of the separation rollers 34 form a separation nip 34N, and feed the sheet sent out by the pickup roller 33 with separating the sheet into one by one.

In more particular, the pair of the separation rollers 34 include a feed roller 35 which is rotatably supported by a feeding frame 60, and the pickup roller 33 described above swings in a manner of centering on a rotation center of this feed roller 35. Also, the pair of the separation rollers 34 include a retard roller 36 facing the feed roller 35, and the retard roller 36 is supported by a separation frame 70 via an arm member 71 in a manner of being capable of swinging. And, by urging this retard roller 36 toward the feed roller 35 with a compression spring 72, the retard roller 36 is brought into a pressure contact with the feed roller 35 with a predetermined force of the pressure contact, and the separation nip 34N described above is formed.

The pair of the drawing rollers 37 are arranged downstream of the pair of the separation rollers 34 in a sheet conveyance direction, and include a drawing roller 38 and a drawing counter roller 39 which abuts on the drawing roller 38 and is drivingly rotated by the drawing roller 38. Similar to the feed roller 35, the drawing roller 38 is rotatably supported by the feeding frame 60, and the drawing counter roller 39 is rotatably supported by a counter frame 80 facing the feeding frame 60.

When a driving force is transmitted to the feeding unit 32 from a driving unit, not shown, the pickup roller 33 described above rotates in an arrow B direction in FIG. 3, and sends out the sheet stored in the feed cassette 31. Also, simultaneously, the feed roller 35 also starts rotation in a same direction as a rotational direction of the pickup roller 33. On the other hand, the driving force is transmitted to the retard roller 36 from the driving unit via a torque limiter 73. When one sheet of the sheet S enters into the separation nip 34N, the torque limiter 73 slides, and the retard roller 36 is rotated in the sheet conveyance direction (arrow A direction opposing arrow B direction) by drivingly rotated by the feed roller 35. Also, when a plurality of sheets of the sheet S enter into the separation nip 34N, the retard roller 36 is drivingly rotated by the driving force from the driving unit in a direction (arrow B direction) of sending back the sheet S to the feed cassette 31. In this manner, the sheets other than the uppermost sheet abutting on the feed roller 35 are sent back to the feed cassette 31, and the sheet is fed with separated into one by one. Then, the sheet S fed by the pair of the separation rollers 34 is delivered to the pair of the drawing rollers 37, and is conveyed by this pair of the drawing rollers 37.

Also, as shown in FIG. 3, at positions L1 and L2, which respectively correspond to positions of the pair of the separation rollers 34 and the pair of the drawing rollers 37, a first and a second sheet detection sensor 91 and 92 are arranged on the sheet conveyance path. These sheet detection sensors, i.e. the first and the second sheet detection sensor 91 and 92, are, by detecting the sheet at the positions L1 and L2, used to detect a sheet overlap and a sheet jam, and to determine a timing to disunite the pair of the separation rollers 34.

Figure 4:
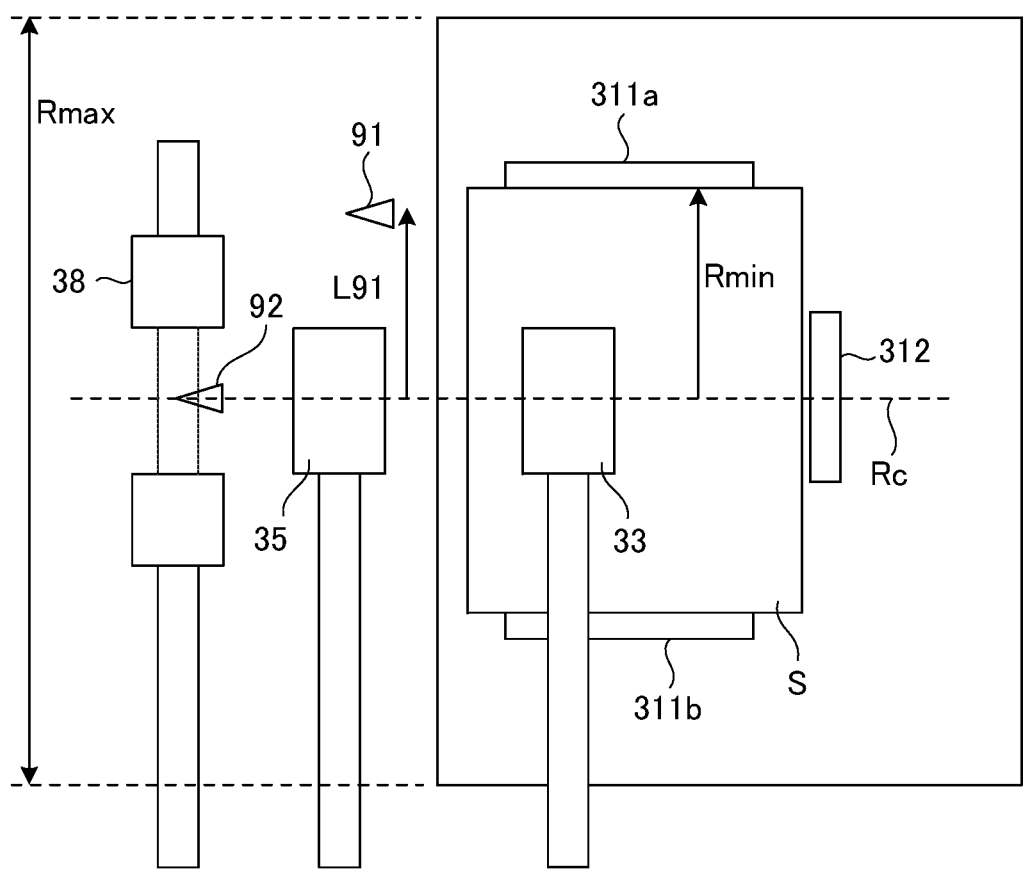
FIG. 4 is a plan view of the feeding unit shown in FIG. 3.

Incidentally, these sheet detection sensors, i.e. the first and the second sheet detection sensor 91 and 92, are, as shown in FIG. 4, arranged at the positions where distances, in the width direction perpendicularly intersecting with the sheet conveyance direction, of these sheet detection sensors from the conveyance center of sheet (conveyance center line) Rc are smaller than a distance Rmin. To be noted, the distance Rmin is a distance between the conveyance center of the sheet Rc and one of the side regulation members 311a in a case of storing a minimum width sheet.

In more particular, the first sheet detection sensor 91 is arranged at a position separated from the conveyance center of the sheet Rc by as much as a distance L91, and this distance L91 is smaller than Rmin (L91<Rmin) In addition, the second sheet detection sensor 92, arranged downstream of the first sheet detection sensor 91 in the sheet conveyance direction, detects the sheet at a position corresponding with the conveyance center of the sheet Rc in the width direction. These arrangements enable the first and the second sheet detection sensor 91 and 92 to detect the sheet even in a case of conveying the minimum width sheet. Also, since the conveyance center of the sheet Rc is a reference line for a conveyance of the sheet, the pickup roller 33 and feed roller 35 described above are arranged at positions where a center of each rotary member in the width direction corresponds with the conveyance center of the sheet Rc. Furthermore, regarding the drawing roller 38 including a plurality of rotary members, the plurality of the rotary members described above are arranged in linear symmetry each other with respect to the conveyance center of the sheet Rc as a symmetry axis.

Wiring of Bundled Sensor Cable

Figure 5A:
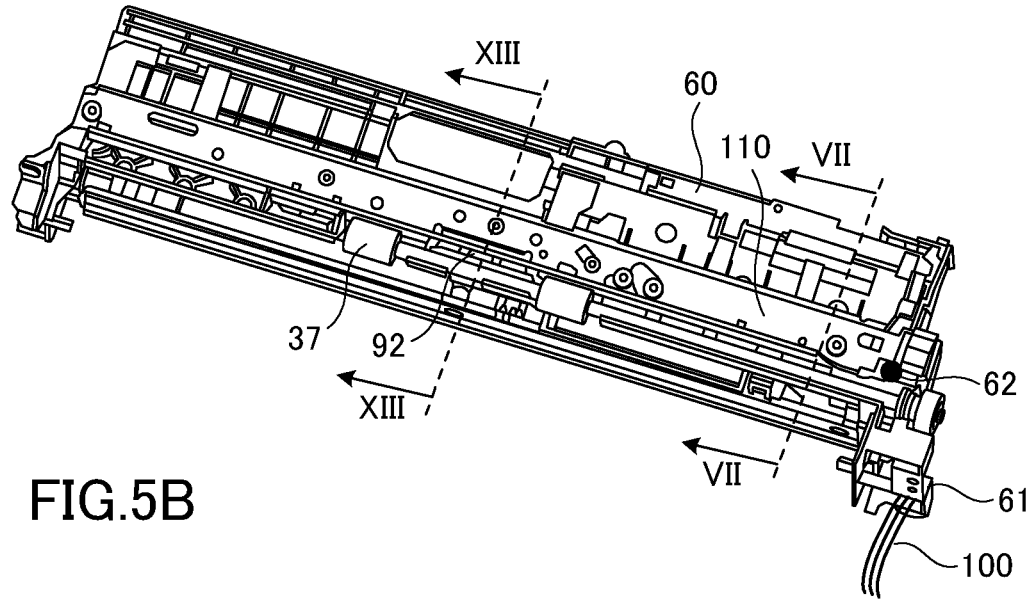
FIG. 5A is a perspective view of the feeding unit from above.
Figure 5B:
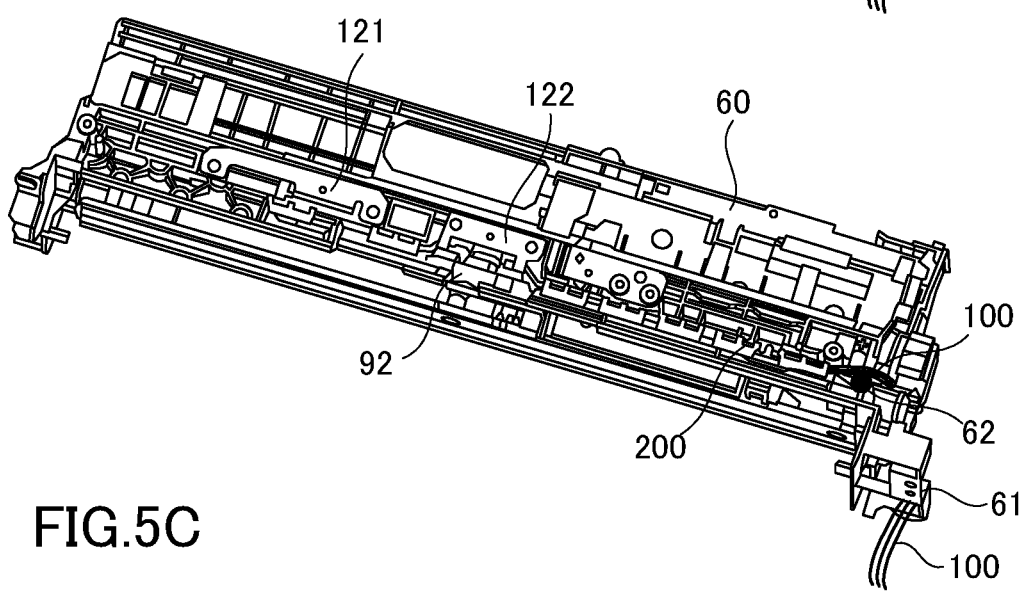
FIG. 5B is a diagram of the feeding unit with a reinforcement metal plate detached.
Figure 5C:
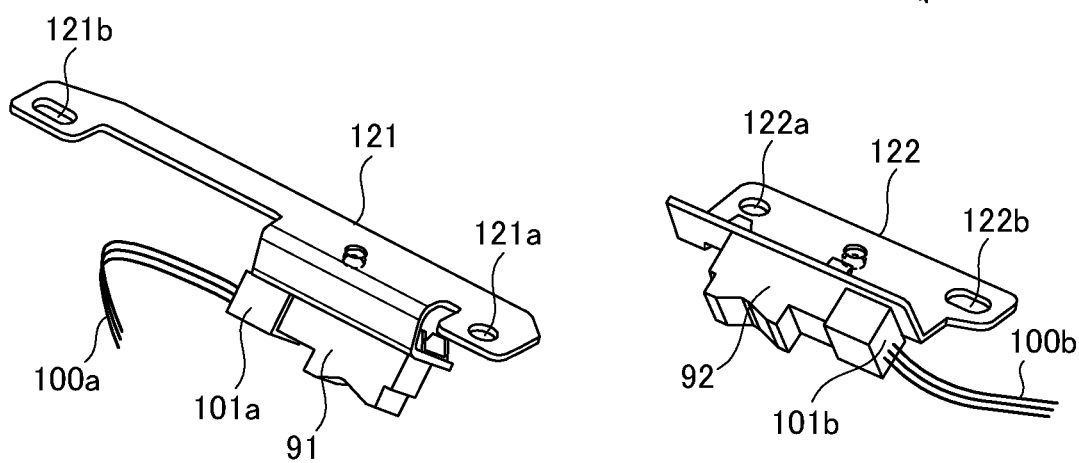
FIG. 5C is a diagram showing fixing portions of a sheet detection sensor.

FIG. 5A is a perspective view of the feeding unit 32, FIG. 5B is a diagram showing the feeding unit 32 with a reinforcement metal plate 110, reinforcing the feeding frame 60, detached, and FIG. 5C is a diagram showing fixing portions of the first and the second sheet detection sensor 91 and 92. As shown in FIGS. 5B and 5C, the first and the second sheet detection sensor 91 and 92 are respectively held by sensor fixing plates 121 and 122, and are also mounted to the feeding frame 60 via these sensor fixing plates 121 and 122. The sensor fixing plates 121 and 122 described above are provided with positioning holes (121a and 121b for the sensor fixing plate 121, and 122a and 122b for the sensor fixing plate 122), and are fixed to the feeding frame 60 by inserting a screw (fixing means) into these positioning holes 121a, 121b, 122a, and 122b.

Figure 6:
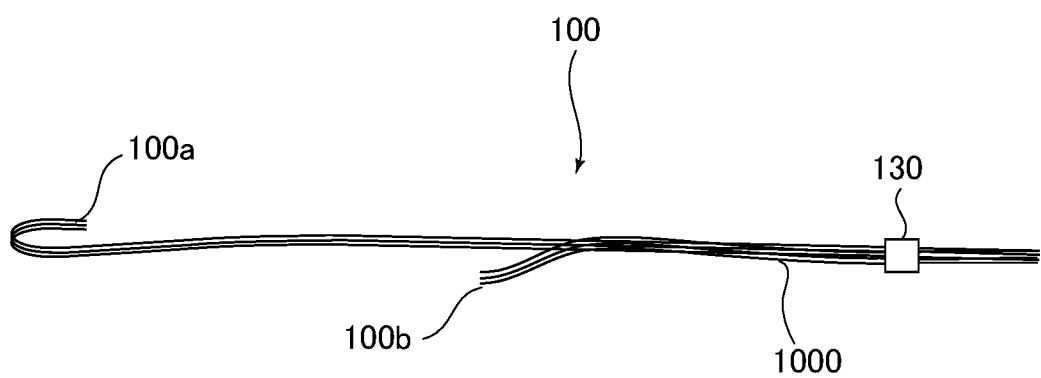
FIG. 6 is a diagram showing a bundled sensor cable.

Also, the first and the second sheet detection sensor 91 and 92 are each coupled to a bundled sensor cable 100, and transmission of an electric signal and a supply of electric power are carried out via this bundled sensor cable 100. This bundled sensor cable 100 is, as shown in FIG. 6, composed of a bundle of a plurality of cables (electric wires) 1000, and is branched to a first end portion 100a coupled to the first sheet detection sensor 91 and a second end portion 100b coupled to the second sheet detection sensor 92. As shown in FIG. 5C, at a tip portion of the first end portion 100a, a connection connector 101a is provided, and this connection connector 101a is plugged into the first sheet detection sensor 91 which is a first electronic device. Also, a tip portion of the second end portion 100b, which is branched on a path to the first end portion 100a, a connection connector 101b is provided, and this connection connector 101b is plugged into the second sheet detection sensor 92, which is a third electronic device. To be noted, another end portion (third end portion) of the bundled sensor cable 100 is coupled to a control unit 300 (refer to FIG. 2), which is a second electronic device, of the printer 1. That is, in this embodiment, the bundled sensor cable 100 is a bundled cable which transmits and/or supplies at least one of the electric signal and the electric power between the first electronic device 91 and the second electronic device 300.

Figure 7:
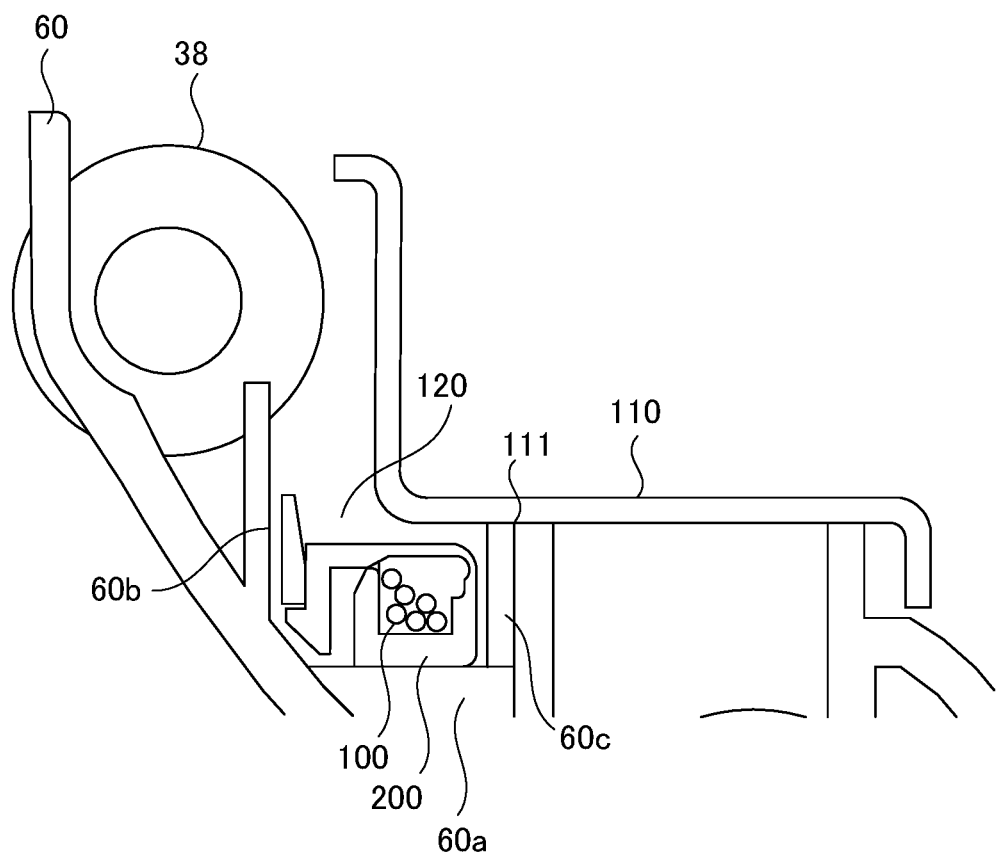
FIG. 7 is a cross-sectional view of the feeding unit taken along an arrow VII-VII of FIG. 5A.

Next, a wiring path of the bundled sensor cable 100 described above will be described in detail. As shown in FIG. 5A, the bundled sensor cable 100 is wired from outside the feeding unit 32, in which the control unit 300 described above is provided, to a bundled cable holder 61 of the feeding frame 60, and is wired around from the bundled cable holder 61 to inside the feeding unit 32. The bundled sensor cable 100, partially fixed at the bundled cable holder 61, is wired around to a protection guide path start point 62 passing a path, not shown. As shown in FIGS. 5B and 7, from this protection guide path start point 62, the bundled sensor cable 100 is wired through a space 120 between the reinforcement metal plate 110 for reinforcement of stiffness of the feeding frame 60 and the feeding frame 60.

In a case where the bundled sensor cable 100 is wired through the space 120 formed between the feeding frame 60 and the reinforcement metal plate 110, there are possibilities that the bundled sensor cable 100 is pinched at an abutment portion 111 between the feeding frame 60 and the reinforcement metal plate 110. Therefore, in this embodiment, the bundled sensor cable 100 is protectively guided by a wiring guide 200 from the protection guide path start point 62.

Wiring Guide

Figure 8:
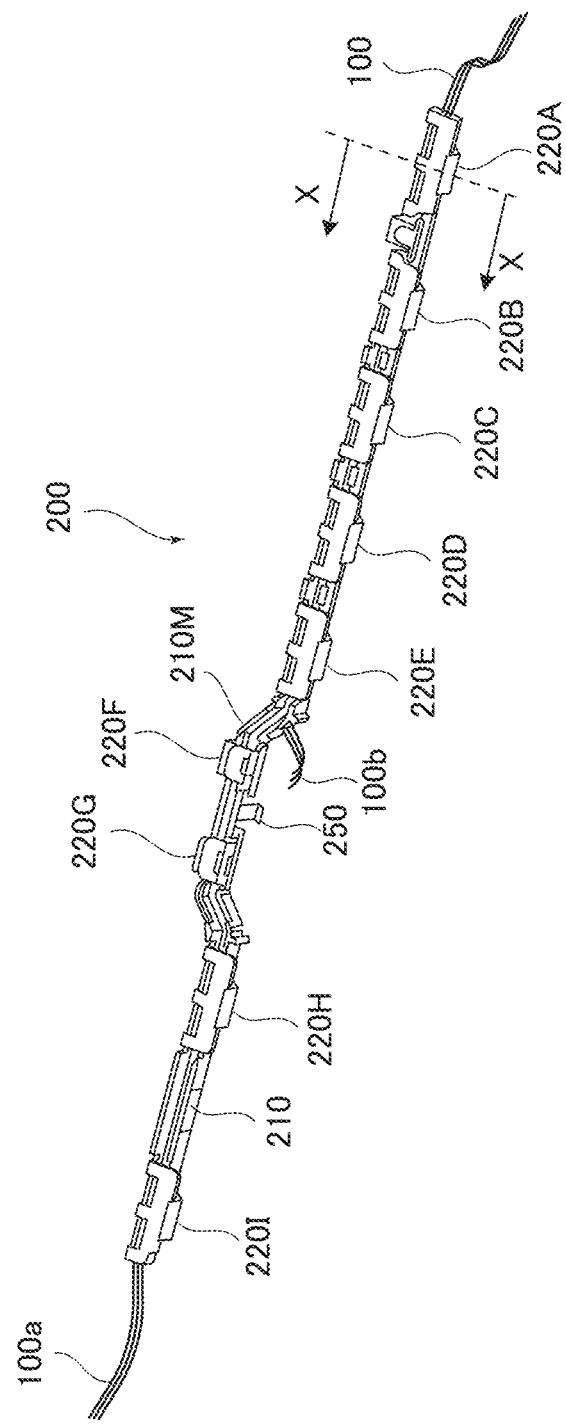
FIG. 8 is a perspective view of a wiring guide.

Next, a configuration of the wiring guide 200 will be described in detail. As shown in FIGS. 8 and 9, the wiring guide 200 includes a storage portion 210 to store the bundled sensor cable 100 and holding members 220A to 220I, which are a plurality of holding portions to hold the bundled sensor cable (wire) 100. The storage portion 210 is a component integrally made of a resin, and is extended to a whole length of the wiring path of the bundled sensor cable 100 inside the space 120 described above. Also, the storage portion 210 includes a bending portion 210M which is shaped to bend to avoid the second sheet detection sensor 92 on the way.

The holding members 220A to 220I, which are the holding portions to hold a cable, are also made of a resin, and integrally molded to the storage portion 210. These plurality of the holding members 220A to 220I hold the bundled sensor cable 100 at different positions on the wiring path so that the cable of the bundled sensor cable 100 does not jump out to outside the storage portion 210.

Figure 10A:
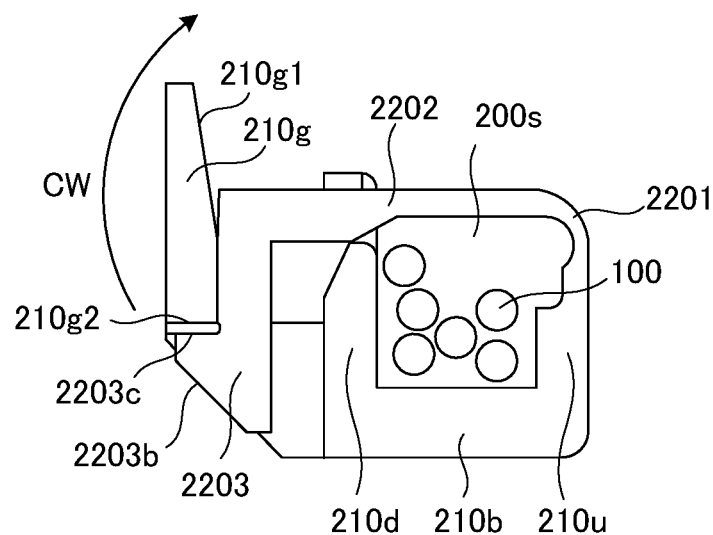
FIG. 10A is a cross-sectional view of the wiring guide taken along an arrow X-X of FIG. 8.
Figure 10B:
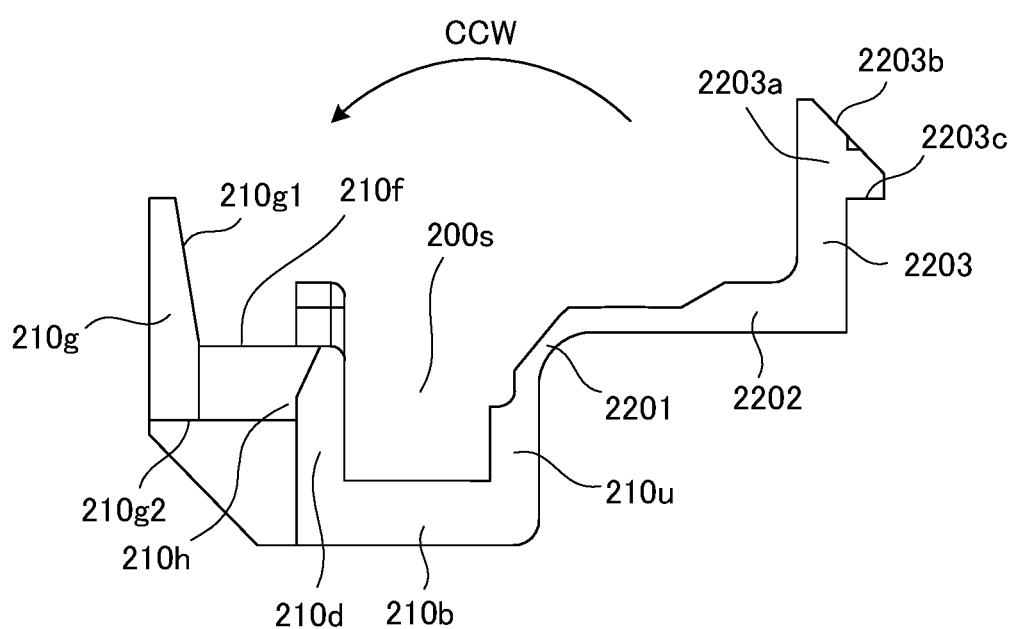
FIG. 10B is a diagram of the wiring guide in the open state.

In more particular, as shown in FIGS. 10A and 10B, a cross section of the storage portion 210 is formed in U-shaped. That is, the storage portion 210 includes a bottom portion 210b, and a pair of side wall portions 210u and 210d which stand to face each other at both ends of the bottom portion 210b in a width direction perpendicularly intersecting with a direction of the wiring path of the bundled sensor cable. Then, a storage space 200s to store the bundled sensor cable 100 is formed by these bottom portion 210b and the side wall portions 210u and 210d.

Each of the plurality of the holding members 220A to 220I includes a hinge portion 2201, a cover portion 2202, and an engagement portion 2203. To be noted, as basic structures of the holding members 220A to 220I are same, the holding member 220A will be described below as a representative, and description of the structures of the other holding members is omitted herein.

The hinge portion 2201 described above is integrally formed to an upper end portion of the side wall portion 210u on an upstream side in the sheet conveyance direction, and the cover portion 2202 is connected to the storage portion 210 in an openable and closable manner via this hinge portion 2201. The cover portion 2202, as shown in FIG. 10A, covers an opening of the storage portion 210 when the holding member 220A is in a closed state, and the engagement portion 2203 is provided at an end of the cover portion 2202 at a downstream side in the sheet conveyance direction.

The engagement portion 2203 is an engagement pawl which holds the holding member 220A at a closed position (closed state) with resisting an elastic force of the hinge portion 2201 and a pressure force of the bundled sensor cable 100. At an upper end portion of the side wall portion 210d which is on a downstream side of the storage portion 210 in the sheet conveyance direction, a flange portion 210f is provided, and this engagement portion 2203 is configured to engage with a through hole 210h provided in this flange portion 210f (refer to FIGS. 10B and 11).

Also, a guide wall 210g is provided at a position corresponding to the through hole 210h in this flange portion 210f. A guide surface 210g1 of a tapered shape inclined to increase a distance from the hinge portion 2201 across the through hole 210h toward an end is formed on a surface of the guide wall 210g facing the through hole 210h. Therefore, when the holding member 220A pivots in a CCW direction in FIG. 10B, an inclined surface 2203b of a pawl portion 2203a of the engagement portion 2203 is guided toward the through hole 210h in sliding on the guide surface 210g1 of the guide wall 210g described above. A surface 2203c of the pawl portion 2203a of the engagement portion 2203 engages with an engagement surface 210g2 provided at a lower end of the guide wall 210g to make the closed state. To be noted, in the closed state, the opening of the storage portion 210 is covered with the holding member 220A, and the storage space 200s for storing the bundled sensor cable 100 is annularly formed. Also, in the closed state, a rotational moment in a CW direction in FIG. 10A is generated in the holding member 220A by an elastic force of the hinge portion 2201. Therefore, the pawl portion 2203a of the engagement portion 2203 bites the engagement surface 210g2, and the closed state is secured.

Figure 11:
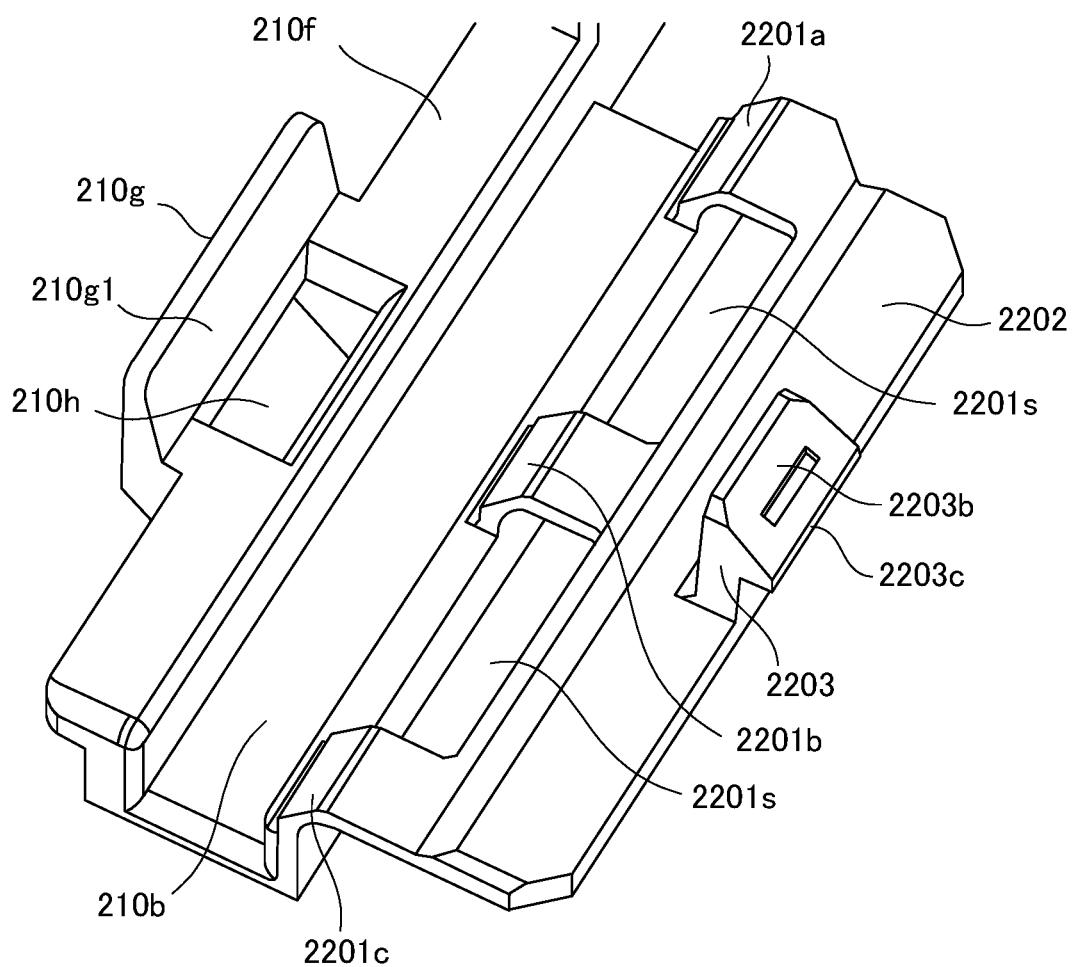
FIG. 11 is an enlarged-view of a holding portion.

Next, a procedure to open the holding member 220A from the closed state to an open state will be described. In the hinge portion 2201 described above, a pair of slits 2201s are formed as shown in FIGS. 11 and 12A, and a plurality (in a case of this embodiment is three) of connection portions 2201a to 2201c are furnished. Here, as the guide wall 210g is positioned at higher than the cover portion 2202 and arranged in adjacent to the cover portion 2202, it is difficult to make a contact with a central portion of the cover portion 2202 when the holding member 220A is in the closed state. Therefore, although it is configured for a worker to press edges of the cover portion 2202 to shift the holding member 220A to the open state, as illustrated in FIG. 12B, it is not possible to disengage the engagement portion 2203 from the through hole 210h by pressing one of the edges of the cover portion 2202.

In particular, when only one of the edges X1 of the cover portion 2202 is pressed, the connection portions distort such that an amount of the distortion is larger as its distance from a pressed point is smaller (2201c>2201b>2201a). Due to differences in degrees of distortions, the cover portion 2202 is inclined by drawing back from the guide wall 210g inversely proportionally to the distance from the pressed point. However, an inclination of the cover portion 2202 is restricted by an abutment of a corner portion 2203x on a back surface of the engagement portion 2203 on the side wall portion 210d of the storage portion 210. Then, in this position, a dimensional relation of the engagement portion 2203 with the through hole 210h is designed to secure an engagement of the corner portion 2203x with a diagonal corner portion 2203y in a planar view, at least.

Figure 12:
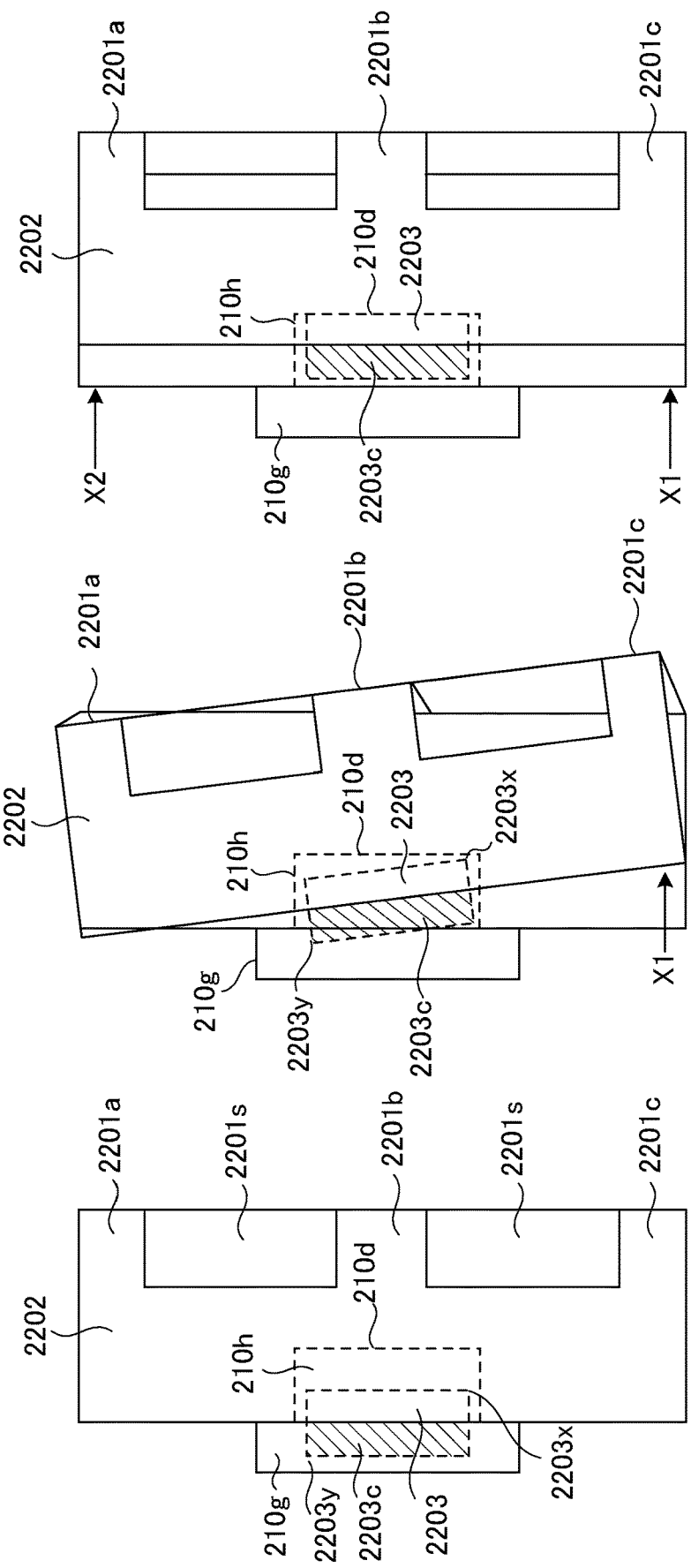
FIG. 12A is a schematic view of the holding portion.
FIG. 12B is a schematic view of the holding portion with one of edges of a cover portion being pressed.
FIG. 12C is a schematic view of the holding portion with both edges of the cover portion being pressed.

On the other hand, when both edges (positions X1 and X2) across the guide wall 210g are pressed, as shown in FIG. 12C, the connecting portions 2201a to 2201c displace in such a manner that the back surface of the engagement portion 2203 keeps a contact by following the side wall portion 210d. That is, by moving the cover portion 2202 parallelly, the pawl portion 2203a of the engagement portion 2203 is disengaged from the engagement surface 210g2 of the guide wall 210g, and the pawl portion 2203a is able to pass through the through hole 210h.

As described above, in this embodiment, the wiring guide 200 is a bundled cable guide including the storage portion 210, which forms the storage space 200s to store the bundled cable 100, and the plurality of the holding members 220A to 220I, which are arranged at different positions on the wiring path. The storage portion 210 includes the bottom portion 210b extended in the direction along the wiring path of the bundled cable 100, i.e., a wiring direction of the bundled cable 100, and the pair of the side wall portions 210u and 210d standing to face each other at the both edges of the bottom portion 210b in a width direction orthogonal to the direction along the wiring path, and the storage space 200s described above is formed by the bottom portion 210b and the pair of the side wall portions 210u and 210d. Also, each of the plurality of the holding members 220A to 220I includes the hinge portion 2201 connected to the upper end of the side wall portion 210u, the cover portion 2202 connected to the storage portion 210 via the hinge portion 2201 in the openable and closable manner, and the engagement portion 2203 configured to secure the cover portion 2202 at the closed position, and holds the bundled cable 100 inside the storage portion with the cover portion 2202 being secured by the engagement portion 2203.

Wiring Method for Bundled Sensor Cable

Next, a wiring method for the bundled sensor cable 100 will be described. At a start of wiring the bundled sensor cable 100 to the feeding unit 32, the worker puts around the bundled sensor cable 100 to the protection guide path start point 62. Next, as shown in FIG. 5C, the first and the second end portion 100a and 100b of the bundled sensor cable 100 are respectively coupled to the first and the second sheet detection sensor 91 and 92. When the first and the second end portion 100a and 100b have been respectively coupled to the first and the second sheet detection sensor 91 and 92, the worker assembles the bundled sensor cable 100 to the wiring guide 200 with the holding members 220A to 220I being in the open state as shown in FIG. 9. In particular, the bundled sensor cable 100 is, as shown in FIG. 6, bundled with a bundling band 130, a bundling member, in a front direction of a branch of the first and the second end portion 100a and 100b. Also, the storage portion 210 of the wiring guide 200 is provided with a band holding portion 250 to restrict an upward movement of the bundling band 130 by holding the bundling band 130 between the holding member 220A, as a first holding portion, and the holding member 220B, as a second holding portion. The bundling band 130 holds the bundled sensor cable 100 to secure all the cables in the bundled sensor cable 100 not to make a positional shift. At first, the worker assembles the bundling band 130 to this band holding portion 250. Then, having wired the bundled sensor cable 100 inside the storage portion 210, the worker closes the holding members 220A to 220I which have been in the open state, and makes a state as shown in FIG. 8.

Figure 13:
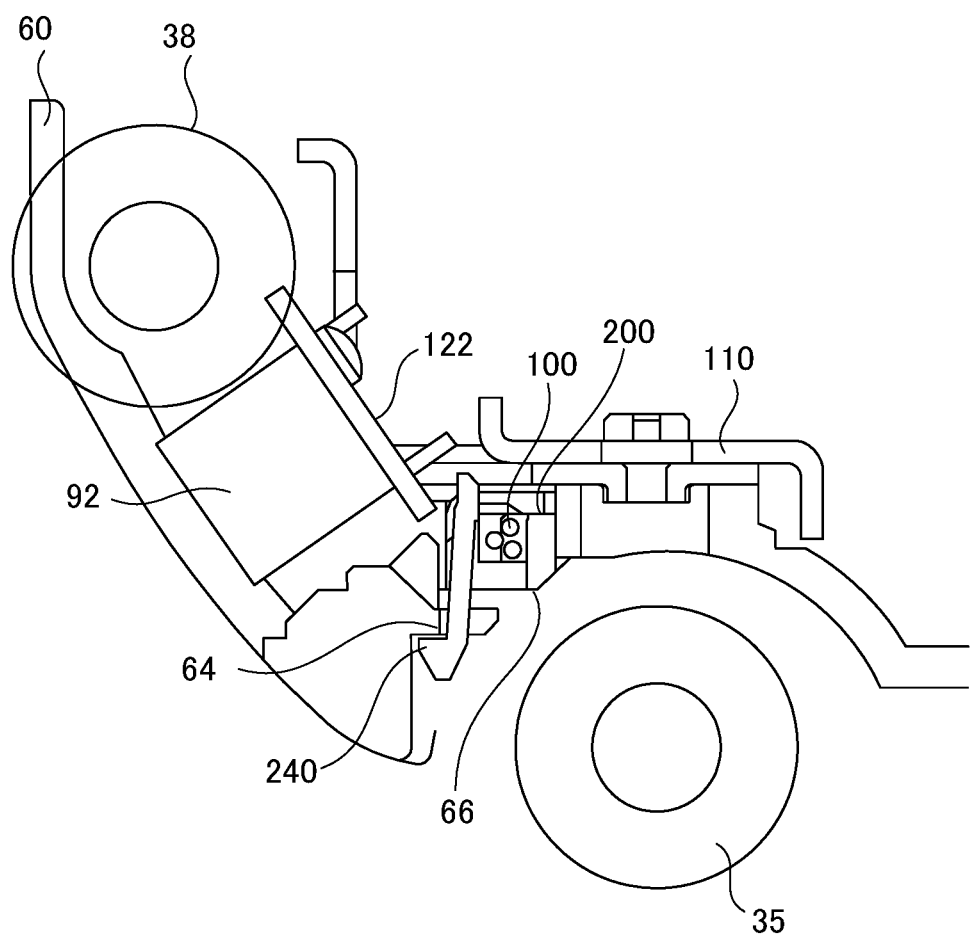
FIG. 13 is a cross-sectional view of the feeding unit taken along an arrow XIII-XIII of FIG. 5A.

When the bundled sensor cable 100 is stored to the wiring guide 200, the worker, as shown in FIGS. 7 and 13, fits the wiring guide 200 collectively with the bundled cable 100 described above into a wiring groove 66 formed in the feeding frame 60. To be noted, in the storage portion 210 of the wiring guide 200, a protrusion portion 240 (anchor portion) is formed as shown in FIG. 13. Then, the wiring guide 200 is fixed to the feeding frame 60 by inserting this protrusion portion 240 into an engagement hole 64 formed in the feeding frame 60.

Figure 14:
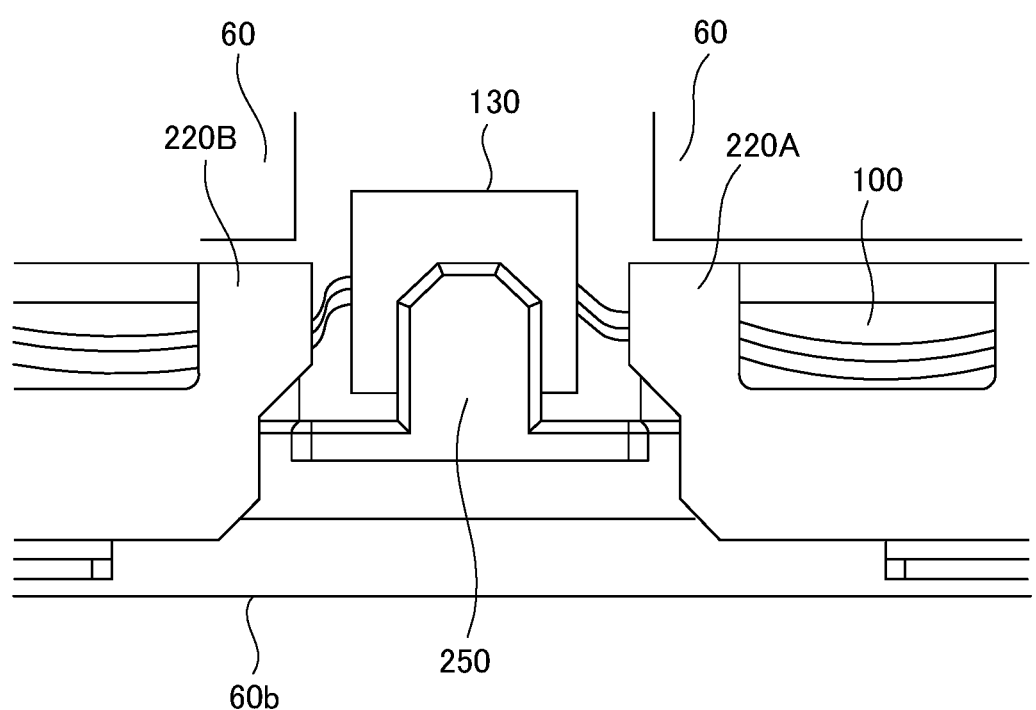
FIG. 14 is a diagram showing a band holding portion.

The wiring groove 66 described above is formed with a bottom portion 60a and a pair of rib portions 60b and 60c standing on the bottom portion 60a, and a depth of the groove is larger than a height of the wiring guide 200 described above. Therefore, the bundled sensor cable 100 is collectively stored in the wiring groove 66 with the wiring guide 200 completely, and in this state the worker assembles the sensor fixing plates 121 and 122 to the feeding frame 60, and thereafter assembles the reinforcement metal plate 110 to the feeding frame 60. To be noted, the rib portions 60b and 60c are, as shown in FIG. 14, partially opened in adjacent to the band holding portion 250, and allow a bulge of the bundling band 130.

As described above, in this embodiment, the wiring guide 200 is extended along the wiring path, and the bundled sensor cable (wire) 100 is held at the plurality of positions on the wiring path with the plurality of the holding members 220A to 220I so as to be wired along the wiring guide 200. Therefore, it is possible to inhibit the bundled sensor cable 100 to interfere with other members along the wiring path.

In particular, in this embodiment, the reinforcement metal plate 110, a cover member, is fitted to the feeding frame 60, which is a fixing member to be furnished with the wiring guide 200, and the bundled sensor cable 100 is wired in a space portion between the feeding frame 60 and the reinforcement metal plate 110. In this case, there are possibilities that the bundled sensor cable 100 is pinched at a large number of points between the feeding frame 60 and the reinforcement metal plate 110. However, the wiring guide described above is extended to the whole length of the wiring path in the relevant space portion, and prevents the bundled sensor cable 100 from being pinched between the feeding frame 60 and the reinforcement metal plate 110.

Also, as shown in FIG. 7, a part of the drawing roller 38, the rotary member, is exposed to the space portion described above. However, as the bundled sensor cable 100 is securely stored inside the storage portion 210 with the holding members 220A to 220I described above, the bundled sensor cable 100 also does not interfere with this rotary member. That is, as described above, the reinforcement metal plate 110 and the drawing roller 38 become facing members facing the bundled sensor cable 100 along the wiring path. Then, with the holding members 220A to 220I, the bundled sensor cable (wire) 100 is held inside a specified wire holding area not interfering with the facing members even in a presence of these facing members. That is, the bundled sensor cable 100 is held within an area of a space between the fixing members and the facing members with the holding members 220A to 220I.

In addition, the wiring guide 200 described above is fitted into the wiring groove 66, a groove portion, provided in the feeding frame 60, and stored. Therefore, the wiring guide 200 enables to guide the bundled sensor cable 100 in a place where ordinarily no adequate space is found to install a guide or carry out a work to guide the bundled sensor cable 100. Furthermore, the wiring groove 66 described above is furnished with an adequate depth for fully storing the wiring guide 200 as a whole, possibilities of the bundled sensor cable 100 interfering with the facing members are further reduced.

Also, the wiring guide 200 described above is formed as an independent member from the feeding frame 60. Therefore, it is not necessary to wire the bundled sensor cable 100 directly to the feeding frame 60, but is possible to wire the bundled sensor cable 100 by storing the bundled sensor cable 100 to the wiring guide 200 at first and thereafter furnishing the feeding frame 60 with this wiring guide 200. This eliminates a need for the worker to carry out a wiring work of the bundled sensor wire 100 in a narrow space (for example, a corresponding wiring work at the bending portion 210M), and improves a workability in producing the feeding unit 32. Also, as it is allowed to fit the wiring guide with the bundled sensor cable 100 stored beforehand into the wiring groove 66, the bundled cables 1000 are not disarrayed during a wiring work of the bundled sensor cable 100, and interference of cables disarrayed from the wiring path with the facing members is prevented.

That is, a method for producing the feeding unit 32 according to this embodiment includes a process to prepare the wiring guide 200 formed in accordance with a shape of the specified wiring path and the process to fix the bundled sensor cable (wire) 100 to the wiring guide 200. As described above, by furnishing the wiring guide 200 with the bundled sensor cable 100 stored beforehand, it is attainable to prevent the interference of wires, to improve a work efficiency, to increase a degree of freedom for design of the wiring path, and to reduce the size of an apparatus.

Since use of the wiring guide 200 described above enables to carry out the wiring work with the bundled sensor cable 100 stored in the wiring guide 200 in advance, the work efficiency is better than a work efficiency of, for example, a work where a bundled cable is directly wired to the feeding frame 60 via a clamp member. Also, since in a way of the work described above it is difficult to arrange the electric power source in adjacent to a place where an arrangement of a sensor is required, there is a need to wire the bundled sensor cable 100 on a path formed in a narrow space inside the unit. However, even in a case like this, the use of the wiring guide 200 reduces risks of deviation of a part of the bundled sensor cable 100 from a specified path and a disconnection of a cable during a work. In addition, by making the plurality of the holding members (clamp portions) 220A to 220I capable of locking and unlocking independently each other, it is possible to form a plurality of paths integrally even in a case where a branch is required in the path.

Also, since the holding members 220A to 220I, as the clamp portions, are possible to change a protection area (size of the cover portion 2202) by changing a thickness of the hinge portion and a shape of the slit, it is possible to form a guide which fits the storage portion 210. Furthermore, although the wiring guide 200 with a shape described in this embodiment has a tendency to curve to lift a central portion in a longitudinal direction upwardly, it is possible to securely hold the wiring guide 200 by providing engagement portions 240 and 64 only at the central part for an engagement with the feeding frame 60. However, a holding configuration of the wiring guide 200 is not limited to this, and the engagement portions 240 and 64 may be provided at a plurality of positions. Also, although the wiring guide 200 described above is fixed to the feeding frame 60, which is the fixing member, it is acceptable to fix to, for example, the cover member and the like.

Furthermore, in the embodiment described above, the first sheet detection sensor 91 is designated as the first electronic device, and the control unit 300 of the printer 1 is designated as the second electronic device. However, it is acceptable that, for example, the control unit 300 of the printer 1 is designated as the first electronic device and the first sheet detection sensor 91 is designated as the second electronic device. That is, it is acceptable to protect and guide the bundled sensor cable 100 around the control unit 300 by the wiring guide 200. In this case, the wiring guide 200 is not attached to the frame member such as the feeding frame 60 to which the first sheet detection sensor 91 is mounted, but fitted into a groove formed in the frame member to which the control unit 300 is mounted.

In addition, in the embodiment described above, a case of wiring the bundled sensor cable 100 to the feeding unit 32 is described as an application example of the wiring guide 200, an applicable case is not limited to this, and effective to any structures in which a wire is wired to a unit. That is, it is not limited to the feeding unit 32 which includes a sheet detection sensor as the electronic device, and it is applicable to, for example, another unit than the image forming apparatus if the unit is the electronic apparatus furnished with the electronic device to which the first end portion of the cable is coupled. Furthermore, it is also applicable to another electronic apparatus such as a digital camera.

Also, although, in the embodiment described above, an example of wiring the bundled sensor cable 100 bundling the plurality of cables 1000 is described, it, for example, is acceptable to use the wiring guide 200 for wiring a single cable. In addition, it is not necessary to configure the holding members (clamp portions) 220A to 220I of the wiring guide 200 integrally to the storage portion 210, and acceptable to configure each other independently. Furthermore, for example, regarding the wiring guide 200, it is acceptable that a holding portion stands on a base portion having a plurality of holes and wires are wired through these holes.

Also, it should be noted that the "wiring path" in the embodiment described above may not include a wiring path at the end portion since the wiring path at the end portion is discretionary for a connection with a connection object such as the first and the second sheet detection sensor 91 and 92. That is, either or not the end portion is stored in the wiring guide 200 is acceptable, and if the wiring guide 200 is at least extended over the wiring path to the end portion, the wiring guide 200 (the storage portion 210) is deemed to be extended over the whole length of the wiring path.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-092454, filed May 15, 2019, which is hereby incorporated by reference herein in its entirety.

What is claimed is:

1. An electronic apparatus comprising:
    a sheet detection sensor configured to detect a sheet;
    an electronic device;
    a bundled wire comprising one end coupled to the sheet detection sensor, and another end coupled to the electronic device, the bundled wire being configured to supply at least one of an electric signal and electric power between the sheet detection sensor and the electronic device;
    a frame member to which the sheet detection sensor is mounted; and
    a bundled wire guide configured to store the bundled wire and being attached to the frame member, the bundled wire guide comprising:

a storage portion comprising a bottom portion extending in a direction along a wiring path of the bundled wire, and a pair of side wall portions standing on both edges, in a width direction orthogonal to the direction along the wiring path of the bundled wire, of the bottom portion and facing each other, wherein the bottom portion and the pair of the side wall portions form space to store the bundled wire is formed with; and a plurality of holding portions disposed at different positions on the wiring path, wherein each of the plurality of the holding portions comprises a hinge portion connected to an upper portion of one of the pair of the side wall portions, a cover portion connected to the storage portion via the hinge portion in an openable and closable manner, and an engagement portion to secure the cover portion in a closed position, and each of the plurality of the holding portions is configured to hold the bundled wire in the storage portion with the cover portion secured in the closed position by the engagement portion.

2. The electronic apparatus according to claim 1, further comprising a cover member being connected to the frame member, and forming a space portion between the frame member and the cover member for wiring of the bundled wire.

3. The electronic apparatus according to claim 2, wherein the storage portion of the bundled wire guide is configured to extend over a whole length of the wiring path of the bundled wire in the space portion between the frame member and the cover member.

4. The electronic apparatus according to claim 2, further comprising a rotary member being at least partially exposed to the space portion between the frame member and the cover member.

5. The electronic apparatus according to claim 1, further comprising a facing member disposed along the wiring path of the bundled wire and facing the bundled wire, wherein the plurality of the holding portions hold the bundled wire within space between the frame member and the facing member.

6. The electronic apparatus according to claim 1, further comprising a second electronic device different from the sheet detection sensor and the electronic device, wherein the bundled wire guide is bent so as to avoid the second electronic device.

7. The electronic apparatus according to claim 1, further comprising a bundling member configured to bundle a plurality of wires composing the bundled wire, wherein the bundled wire guide comprises a bundling member holding portion to hold the bundling member between a first and a second holding portion among the plurality of the holding portions.

8. An image forming apparatus comprising:
the electronic apparatus according to claim 1; and
the image forming apparatus configured to form an image on a sheet.

9. The electronic apparatus according to claim 1, wherein the frame member comprises a groove portion to which the bundled wire guide is fitted, and the bundled wire guide with the bundled wire stored is fitted into the groove portion.

10. The electronic apparatus according to claim 9, wherein the groove portion is deep to fully store a whole of the bundled wire guide inside.

11. A method for producing an electronic apparatus, wherein the electronic apparatus comprises a sheet detection sensor configured to detect a sheet, an electronic device, and a bundled wire with one end coupled to the sheet detection sensor and another end coupled to the electronic device, the bundled wire being configured to supply at least one of an electric signal and an electric power between the sheet detection sensor and the electronic device, the method comprising:

preparing a bundled wire guide in accordance with a shape of a wiring path of the bundled wire, the bundled wire guide comprising:

a storage portion comprising a bottom portion extending in a direction along the wiring path of the bundled wire, and a pair of side wall portions standing on both edges, in a width direction orthogonal to the direction along the wiring path of the bundled wire, of the bottom portion and facing each other, wherein the bottom portion and the pair of the side wall portions form space to store the bundled wire; and a plurality of holding portions disposed at different positions on the wiring path, each of the plurality of the holding portions comprising a hinge portion connected to an upper portion of one of the pair of the side wall portions, a cover portion connected to the storage portion via the hinge portion in an openable and closable manner, and an engagement portion to secure the cover portion in a closed position;

storing the bundled wire to the bundled wire guide; and
fitting the bundled wire guide, with the bundled wire stored, into a groove portion disposed in a frame member of the electronic apparatus.

\* \* \* \* \*